(12) United States Patent
Porob et al.

(10) Patent No.: US 8,137,645 B2
(45) Date of Patent: Mar. 20, 2012

(54) RARE EARTH RECOVERY FROM FLUORESCENT MATERIAL AND ASSOCIATED METHOD

(75) Inventors: Digamber Gurudas Porob, Bangalore (IN); Alok Mani Srivastava, Niskayuna, NY (US); Prasanth Kumar Nammalwar, Bangalore (IN); Gopi Chandran Ramachandran, Bangalore (IN); Holly Ann Comanzo, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/710,601

(22) Filed: Feb. 23, 2010

(65) Prior Publication Data

US 2011/0206580 A1 Aug. 25, 2011

(51) Int. Cl.
*C01F 17/00* (2006.01)
(52) U.S. Cl. ..................................... 423/21.1
(58) Field of Classification Search ................ 423/21.2, 423/21.1
See application file for complete search history.

(56) References Cited

U.S. PATENT DOCUMENTS

| | | | |
|---|---|---|---|
| 3,717,584 A * | 2/1973 | Byler et al. ............ | 252/301.4 R |
| 3,763,050 A | 10/1973 | Dikhoff et al. | |
| 5,330,791 A | 7/1994 | Aihara et al. | |
| 5,403,403 A | 4/1995 | Lee | |
| 6,042,748 A | 3/2000 | Inoue et al. | |
| 6,562,260 B2 | 5/2003 | Gingerich et al. | |
| 6,869,327 B2 | 3/2005 | Gyorgy et al. | |
| 2003/0057399 A1 | 3/2003 | Gingerich et al. | |
| 2009/0162267 A1 | 6/2009 | Otto et al. | |

FOREIGN PATENT DOCUMENTS

| | | | |
|---|---|---|---|
| DE | 246551 A | * | 6/1987 |
| JP | 60161330 A | * | 8/1985 |
| WO | 2006106641 A1 | | 10/2006 |

OTHER PUBLICATIONS

T. Hirajima K. Sasaki, A. Bissombolo, H. Hiraib, M. Hamada, M. Tsunekawa; Feasibility of an efficient recovery of rare earth-activated phosphors from waste fluorescent lamps through dense-medium centrifugation; Separation and Purification Technology 44 (2005) 197-204.

* cited by examiner

*Primary Examiner* — Melvin Mayes
*Assistant Examiner* — Melissa Stalder
(74) *Attorney, Agent, or Firm* — Francis T. Coppa

(57) ABSTRACT

A method of recovering a rare earth constituent from a phosphor is presented. The method can include a number of steps (a) to (d). In step (a), the phosphor is fired with an alkali material under conditions sufficient to decompose the phosphor into a mixture of oxides. A residue containing rare earth oxides is extracted from the mixture in step (b). In step (c), the residue is treated to obtain a solution, which comprises rare earth constituents in salt form. Rare earth constituents are separated from the solution in step (d).

15 Claims, 1 Drawing Sheet

RARE EARTH RECOVERY FROM FLUORESCENT MATERIAL AND ASSOCIATED METHOD

BACKGROUND

The invention relates generally to a method for recovering rare earth constituents from a fluorescent material (phosphor), for example, from phosphor waste. More particularly, the invention relates to a method for recovering rare earth constituents from a fluorescent material by a chemical route.

A phosphor is a luminescent material that absorbs radiation energy in a portion of the electromagnetic spectrum, and emits energy in another portion of the electromagnetic spectrum. Phosphors of one important class are crystalline inorganic compounds of high chemical purity, and of controlled composition, to which small quantities of other elements (called "activators") have been added to convert them into efficient fluorescent materials. With the appropriate combination of activators and inorganic compounds, the color of the emission can be controlled. Phosphors are widely applied in various systems or devices with an annual volume growth of approximately 5%. Major applications are in emissive displays, fluorescent lamps and cathode ray tubes (CRT).

Rare-earth doped phosphors (also referred to as rare earth phosphors) play a critical and indispensable role as fluorescent materials in lighting and display applications. Usually, rare earth phosphor based devices exhibit a relatively high efficiency. The common triphosphor blend of fluorescent lamps generate red light via the emission of trivalent europium, blue light via the emission of divalent europium, and green light via the emission of trivalent terbium. Other commonly used rare earths include yttrium, samarium, praseodymium, cerium, lanthanum and gadolinium. A blend of red, green and blue phosphors is typically used for white light emission in display devices and fluorescent lamps.

A large amount of waste phosphor material is recovered from manufacturing residues and disposed devices. The disposed phosphor waste is a potential source of rare earth elements that could be recovered. It is of ecological as well as economic interest to recover or recycle phosphor materials, and especially expensive rare earth elements, which are essential for many applications other than phosphors. Examples of the applications include fabricating different alloys, preparing rare earth magnets, and preparing various types of catalysts.

Most of the prior attempts at rare earth recovery have focused on discarded fluorescent lamps, or computer displays. A few attempts were also made for recovering rare earths from waste phosphors, by pneumatic separation, or by a chemical method. However, these approaches may not always be economically suitable, because of their cost-intensive complexity, and/or their time-consuming nature.

It would therefore be desirable to develop new methods for efficiently recovering rare earths from fluorescent materials—especially from phosphor waste.

BRIEF DESCRIPTION

In one embodiment, a method of recovering a rare earth constituent from a phosphor is disclosed. The method usually includes a number of steps (a) to (d). In step (a) the phosphor is fired with an alkali material under conditions sufficient to decompose the phosphor into a mixture of oxides. A residue containing rare earth oxides is extracted from the mixture in step (b). In step (c) the residue is treated to obtain a solution, which comprises rare earth constituents in salt form. Rare earth constituents are separated from the solution in step (d).

Another embodiment is an alternate method of recovering a rare earth constituent from a phosphor. The method usually includes a number of steps (i) to (v). An acid-soluble rare earth oxide is separated from the phosphor in step (i). In step (ii) the phosphor is fired with an alkali material under conditions sufficient to decompose the phosphor into a mixture of oxides. A residue containing rare earth oxides is extracted from the mixture in step (iii). In step (iv), the residue is treated to obtain a solution, which comprises rare earth constituents in salt form. Rare earth constituents are separated from the solution in step (v).

DRAWINGS

These and other features, aspects, and advantages of the present invention will become better understood when the following detailed description is read with reference to the accompanying drawings, wherein.

DETAILED DESCRIPTION

Figure 1:
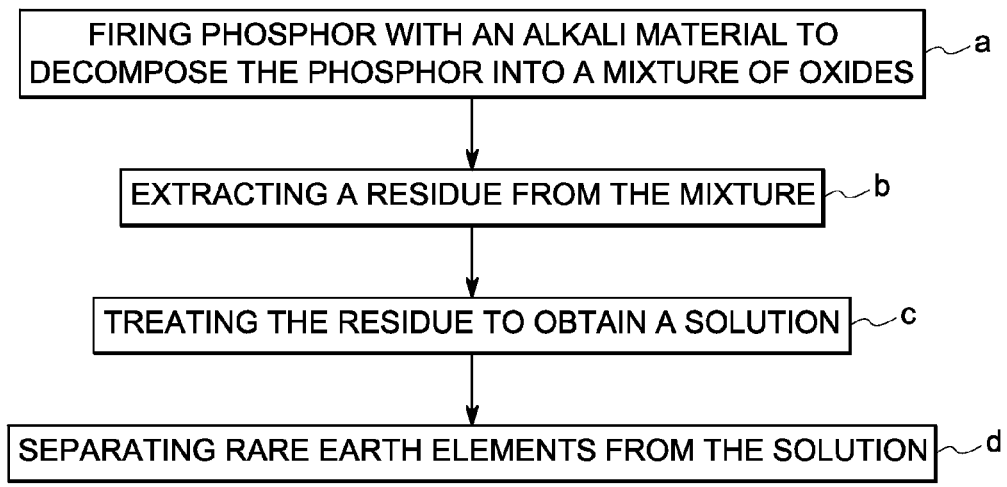
FIG. 1 is a flow diagram depicting a method of recovering a rare earth constituent from a phosphor in accordance with an embodiment of the invention.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and the claims that follow, the singular forms "a", "an" and "the" include plural referents unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur—this distinction is captured by the terms "may" and "may be".

As discussed in detail below, some of the embodiments of the present invention provide a method of recovering rare earths from rare earth containing fluorescent material. These embodiments advantageously provide an improved method for recovery of rare earths. Though the present discussion provides examples in the context of recovery from fluorescent waste, these processes can be applied to other rare earth containing materials or oxides.

As used herein, the term "rare earth constituents" refers to rare earth metals in elemental form or in salt form, or rare earth metal oxides.

As used herein, the term "phosphor" or "phosphor material" usually refers to rare earth-activated phosphors. Moreover, the term "phosphor" or "phosphor material" refers to waste phosphor materials or phosphors waste, either used or unused, which typically arises during production, or during the disposal of different devices. For example, waste phosphors are often collected during recycling of end-of-life or waste fluorescent lamps. These phosphors or waste phosphors may be contaminated by lamp components such as glass, metal, plastic and mercury. Most embodiments of the invention assume the phosphor material that is free of such contamination. In one embodiment, the phosphor contains at least a blue phosphor, a red phosphor or a green phosphor. The blue, red and green phosphors are so called or known after the color of their light emission. Table 1 shows typical examples and compositions of phosphors, along with the proportion (by weight) of rare earths, used in fluorescent lamps. In another embodiment, the phosphor contains a blend of blue, red and green phosphors.

TABLE 1

| Emission | Product | Formula | Rare earths % |
|---|---|---|---|
| Blue | BAM | $BaMgAl_{10}O_{17}:Eu^{2+}$ | 2.5 |
|  | SECA | $(Sr, Ca, Ba)_5(PO_4)_3:Eu^{2+}$ |  |
| Green | CAT | $(Ce, Tb)MgAl_{11}O_{19}$ | 25 |
|  | LAP | $LaPO_4:Ce^{3+}, Tb^{3+}$ | 70 |
|  | CBT | $(Gd, Mg)B_5O_{10}:Ce^{3+}, Tb^{3+}$ | 50 |
| Red | YEO | $Y_2O_3:Eu^{3+}$ | 100 |
|  | YVO | $YVO_4:Eu^{3+}$ | 55 |

According to one embodiment of the invention, a method of recovering a rare earth from a phosphor is illustrated in a flow diagram of FIG. 1. The method is less complex than prior art methods, and involves fewer processing steps, while producing high quality material. The recovered rare earths may be directly usable in different rare earth applications. In first step (a), the phosphor is fired with an alkali material. A hydroxide, a carbonate or an oxide of group I and group II elements of the periodic table or a combination thereof, is a suitable alkali material for the purpose. Non-limiting examples of alkali materials are sodium hydroxide, potassium hydroxide, sodium carbonate and potassium carbonate.

The phosphor is typically a multi-element complex compound, which decomposes into a mixture of different oxides or carbonates on firing with the alkali material. The mixture includes oxides or carbonates of constituents of the phosphor, for example oxides or carbonates of alkali, alkaline earth and rare earths. In some embodiments, the mixture may further contain phosphates, aluminates, borates, and/or vanadates, depending on the phosphor composition. The constituents of the mixture, which do not contain a rare earth, may be referred to as "non-rare earth constituents" for simplification. The firing is performed at a temperature sufficient to decompose the phosphor. For example, the temperature may be greater than about 150 degrees Celsius. In one embodiment, the firing is performed at a temperature within the range of about 150 degree Celsius to about 1600 degree Celsius, and in a preferred embodiment, from about 300 degree Celsius to about 1000 degree Celsius.

In some embodiments, a mixture or a blend of two or more types of phosphors is processed for recovery of rare earth constituents. For example, a blend may contain red, blue and green phosphors. One type of phosphor may decompose earlier or faster, and at a lower temperature, than another type of phosphor. In those embodiments, the mixture or blend may be fired under such conditions, to selectively decompose one type of phosphor at a time, and extract a rare earth constituent from that particular phosphor.

The mixture obtained from step (a) is carried out through step (b). Step (b) involves extracting a residue from the mixture. The residue includes rare earth oxides. Other non-rare earth constituents in the mixture may be washed away with water, or with an acid, depending on their solubility in water or in an acid. In one embodiment, the mixture is washed with water. In another embodiment, the mixture is washed with a dilute acid, for example hydrochloric acid, nitric acid, or sulfuric acid. In another embodiment, the washing of the mixture is carried out successively with water and the dilute acid. In some embodiments, an organic acid, for example acetic acid, citric acid or formic acid, may be used to wash away the non-rare earth constituents, such as a carbonate or an oxide.

Referring to FIG. 1, the method further includes a treating step (c), which involves treatment of the residue obtained from step (b). As discussed above, the residue contains a mixture of rare earth oxides. In this step (c), the residue is treated to separate out individual rare earth salts or compounds, so as to recover individual rare earth constituents. In one embodiment, the treating step involves acidic digestion of the residue. As used herein, the term "acidic digestion" allows the residue to be completely dissolved into liquid form via heating. The residue is dissolved in an acid at an elevated temperature varying from about 80 degrees Celsius to about 300 degrees Celsius, and specifically to about 150 degrees Celsius. The acidic digestion may be carried out with various strong acids, such as nitric acid, concentrated sulfuric acid or concentrated hydrochloric acid. In a preferred embodiment, the residue is digested with nitric acid. Acidic digestion results in a solution containing individual rare earth salts. For example, in the case of nitric acid digestion, the solution contains individual rare earth nitrate solutions.

The method further comprises step (d), to separate the rare earth constituents from the solution. The individual rare earth salts or elements may be separated from the solution by standard industrial process used to separate lanthanides. Suitable examples of standard industrial processes include ion exchange, solvent extraction, fractional crystallization, or a precipitation process.

Figure 2:
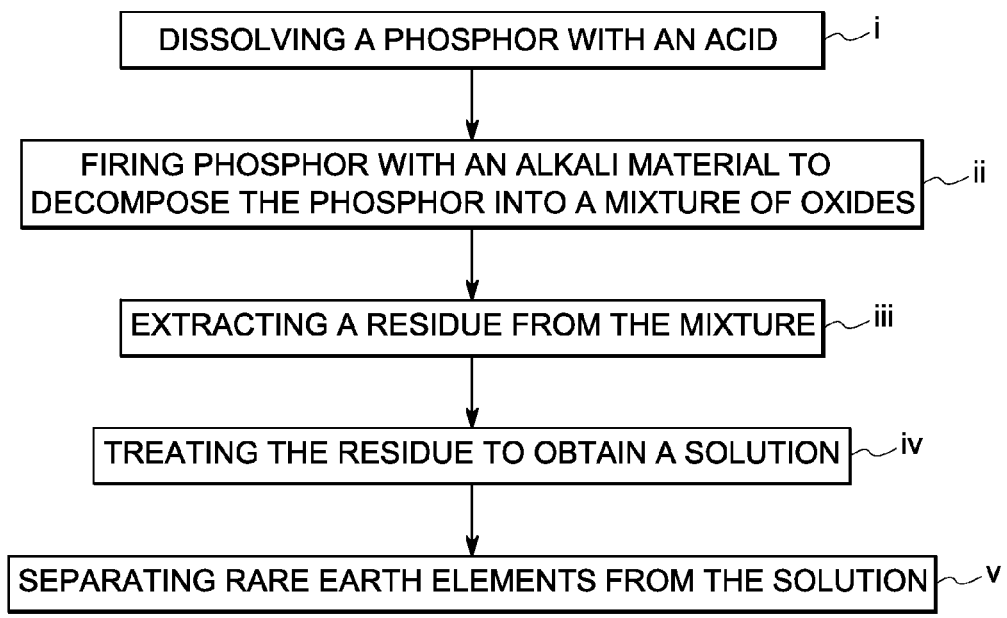
FIG. 2 is flow diagram depicting a method of recovering a rare earth constituent from a phosphor in accordance with another embodiment of the invention.

In some embodiments, an additional step of separating an acid-soluble rare earth oxide is performed before step (a). Some rare earth oxides are soluble in an acid. For example, yittrium oxide is soluble in nitric acid. Other examples of suitable acids are hydrochloric acid, sulfuric acid or the like. The phosphor is dissolved in the acid to separate out such acid-soluble rare earth oxides from the phosphor, before the step of firing the phosphor with an alkali material. A flow diagram of such an embodiment is shown in FIG. 2.

Recovery of rare earth materials, in a salt form or oxide form, advantageously permits re-use of the materials in fluorescent material production. As mentioned above, the recovery can be undertaken at various steps in the overall process. In some embodiments, the residue containing rare earth oxides may be processed using standard procedures for reuse in the synthesis of phosphor material.

EXAMPLES

The example that follows is merely illustrative, and should not be construed to be any sort of limitation on the scope of the claimed invention.

Example 1

Recovery of Terbium from Green Phosphor

A green phosphor, $LaPO_4$:Ce,Tb (LAP), was used in this example. Since this phosphor does not have any related acid-soluble rare earth oxide, it was directly fired with sodium carbonate at 1000 degrees Celsius. As a result, LAP decomposed into mixed lanthanum, cerium, and terbium oxide. A byproduct, sodium phosphate, was also produced. The mixture was then washed with water. Being soluble in water, sodium phosphate was carried away with the water-wash. The remaining rare earth component, containing (La, Ce, Tb) oxide, was carried out through acid digestion, as generally described previously. The mixture was digested with nitric acid until the mixture was completely dissolved. A solution of lanthanum nitrate, cerium nitrate and terbium nitrate was obtained. The solution was boiled at neutral pH to separate out cerium oxyhydroxide and/or cerium oxide. Lanthanum nitrate and terbium nitrate remained in the solution. Terbium can be separated out from this solution by using ion exchange, solvent extraction, or a combination thereof. Alternatively, the solution containing lanthanum nitrate, cerium nitrate and terbium nitrate may be directly used for separation, using ion exchange, solvent extraction, or a combination of these techniques. These processes usually provide lanthanum, cerium and terbium in oxide or nitrate forms.

Example 2

Recovery of Europium from Blue Phosphor

A blue phosphor, $BaMgAl_{10}O_{17}$:$Eu^{2+}$ (BAM), was used in this example. Since this phosphor does not have any related acid-soluble rare earth oxide, it was directly fired with sodium carbonate at 1000 degrees Celsius. As a result, BAM decomposed into barium oxide, barium carbonate, magnesium oxide, sodium aluminate and europium oxide. The mixture was then washed with water. Barium oxide and sodium aluminate were carried away with the water-wash as barium hydroxide and sodium aluminate. The remaining component, containing europium oxide along with barium carbonate and magnesium oxide, was then washed with dilute nitric acid. Barium carbonate and magnesium oxide reacted with the nitric acid, and the reaction products were carried away as nitrates. The europium oxide remained.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of recovering a rare earth constituent from a phosphor, comprising the steps of:
   a) firing the phosphor with an alkali material, under conditions sufficient to decompose the phosphor into a mixture of oxides,
   b) extracting a residue containing rare earth oxides from the mixture,
   c) treating the residue to obtain a solution which comprises the rare earth constituents in salt form, and
   d) separating the rare earth constituents from the solution.

2. The method of claim 1, further comprising the step of separating an acid-soluble rare earth oxide before firing.

3. The method of claim 2, wherein the separating step for the acid-soluble rare earth oxide comprises dissolving the phosphor with an acid.

4. The method of claim 1, wherein the phosphor comprises phosphor waste.

5. The method of claim 4, wherein the phosphor waste is collected from waste fluorescent lamps.

6. The method of claim 1, wherein the phosphor comprises at least a blue phosphor, a red phosphor or a green phosphor.

7. The method of claim 1, wherein firing the phosphor is carried out at a temperature higher than about 150 degrees Celsius.

8. The method of claim 1, wherein the alkali material comprises a hydroxide, a carbonate, an oxide or a combination thereof.

9. The method of claim 8, wherein the alkali material comprises sodium hydroxide, potassium hydroxide, sodium carbonate, potassium carbonate, or combinations thereof.

10. The method of claim 1, wherein extracting step (b) comprises washing the mixture with water or a dilute acid.

11. The method of claim 1, wherein extracting step (b) comprises washing the mixture successively with water and a dilute acid.

12. The method of claim 1, wherein treating step (c) comprises acidic digestion.

13. The method of claim 12, wherein digestion is carried out with nitric acid, sulfuric acid, or hydrochloric acid.

14. The method of claim 1, wherein step (d) is carried out by one or more separation methods selected from ion-exchange, solvent extraction, fractional crystallisation, or precipitation.

15. A method of recovering a rare earth constituent from a phosphor, comprising the following steps:
   (i) separating an acid-soluble rare earth oxide from the phosphor,
   (ii) firing the phosphor with an alkali material, after step (i), under conditions sufficient to decompose the phosphor into a mixture which comprises oxide compounds,
   (iii) extracting a residue containing rare earth oxides from the mixture,
   (iv) treating the residue to obtain a solution which comprises the rare earth constituent in salt form, and
   (v) separating the rare earth constituent from the solution obtained in step (iv).

* * * * *